May 24, 1949.  C. N. SPRINGER ET AL  2,470,905
CHERRY PITTER
Filed April 23, 1947
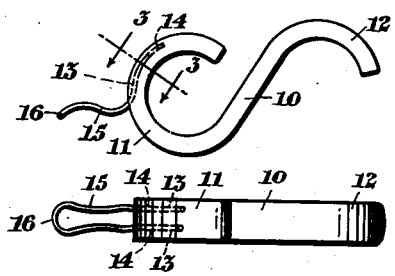
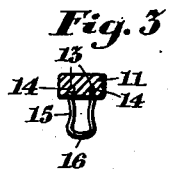
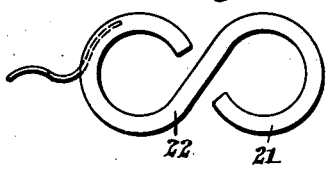
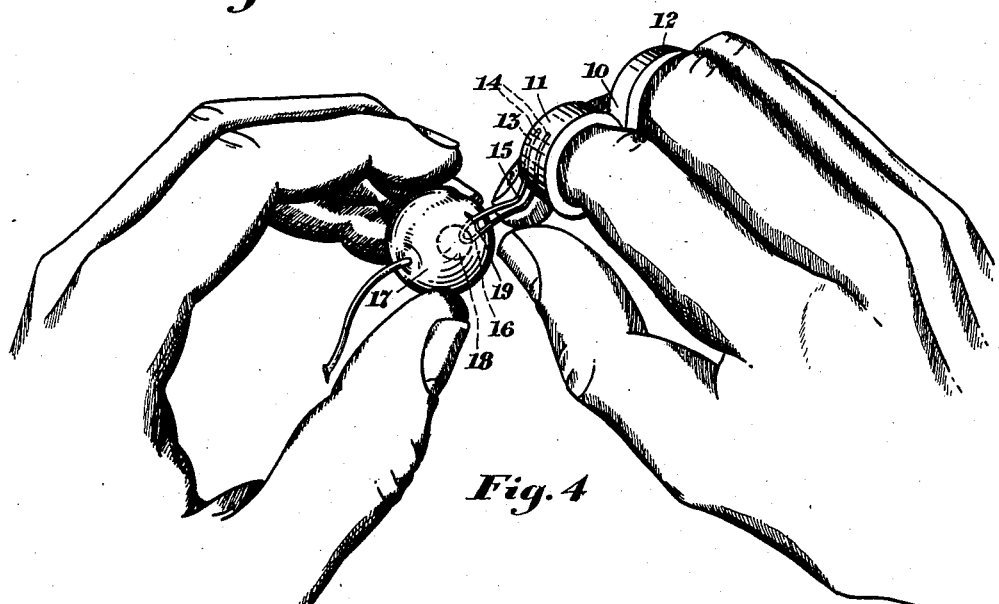
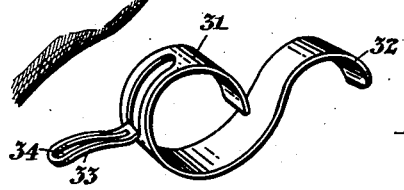
Inventors
Clarence N. Springer
Hester Rae Springer
By John S. Braddock
Attorney Patented May 24, 1949

2,470,905

UNITED STATES PATENT OFFICE 2,470,905

CHERRY PITTER

Clarence N. Springer and Hester Rae Springer, Grand Rapids, Mich.

Application April 23, 1947, Serial No. 743,340

1 Claim. (Cl. 146—21)

The present invention relates to a fruit pitting device and more particularly to a device for removing the pits from cherries.

The primary objects of the invention are to provide a fruit pitting device by means of which the pits may be extracted from cherries or other pitted fruits without losing any of the juice or pulp of the fruit; to provide such a device which may be attached to the index finger of the human hand in such a manner that it is conveniently positioned for the fruit pitting operation while at the same time the fingers are left free for handling the fruit; and to provide such a device which may be economically manufactured, as from stamped sheet metal or from plastic and wire.

Illustrative embodiments of the invention are shown in the accompanying drawing, wherein:

Figure 1 is a side elevational view of a fruit pitting device made in accordance with the invention;

Figure 2 is a top plan view of the same;

Figure 3 is a sectional view thereof taken on line 3—3 of Figure 1;

Figure 4 is a perspective view of the device shown in Figures 1–3 inclusive applied to a human hand and illustrating the positions of the hands, of the fruit, and of the device during the fruit pitting operation;

Figure 5 is a side elevational view of a slightly modified form of fruit pitting device;

Figure 6 is a perspective view of another modified form of the device; and

Figure 7 is a plan view of a sheet metal blank from which the device shown in Figure 6 is formed.

Referring now in detail to this drawing wherein like parts are designated by the same numerals in the several views, the fruit pitting device shown in Figures 1–4 inclusive generally comprises a body member 10 of plastic or other suitable material in the form of a flat bar curled to form a ring portion 11 adapted to snugly embrace the index finger of a human hand as shown in Figure 4, and a hook portion 12 extending laterally from the ring portion 11 and adapted to engage the back of the adjacent or second finger in order to prevent rotation of the body member on the index finger when the device is in use.

The ring portion 11 of the body member has in its outer face opposite the hook portion 12 a pair of upwardly extending sockets 13 therein, in which are embedded the leg portions 14 of a thin, rigid, U-shaped wire scoop 15 whose bight portion 16 projects laterally from the ring portion 11 of the body member in a direction opposite that of the hook portion 12. The bight portion 16 of the scoop 15 is preferably, and as shown, curled downwardly, then upwardly, and then again downwardly in a vertical plane, and outwardly, then inwardly, then outwardly and finally again inwardly in a horizontal plane thus forming a scoop particularly well adapted to engage the pit of a cherry.

In the use of the device, which is illustrated in Figure 4, the cherry pitter is attached to the right hand as shown, and the cherry 17 to be pitted is grasped between the thumb and fingers of the left hand. The scoop 16 is then readily thrust into the cherry and into engagement with the cherry pit 18 and the pit is then withdrawn through the slit 19 formed in the cherry skin by the entry of the scoop into the cherry. The entire operation is performed without the loss of any cherry juice or pulp because the thin wire scoop cuts through the pulp of the cherry without any mashing effect.

In the modification of the device shown in Figure 5, the hook portion 21 of the body member 22 is curled into a nearly complete ring adapted to encircle the second finger. The advantage of this construction is that the device is prevented from rotation on the index finger in either direction.

The embodiment of the invention shown in Figure 6 is formed from a sheet metal blank illustrated in Figure 7 curled to form a ring portion 31 adapted to snugly embrace the index finger, a laterally extending hook portion 32 adapted to engage behind the second finger, and an oppositely laterally extending scoop 33 stamped from the metal blank and pierced at 34 so that the scoop will readily cut through the pulp of the cherry.

While the device as shown and described is particularly adapted for the extraction of cherry pits, the invention may be embodied in other forms adapted to extract the pits from apricots, peaches, dates, plums, olives or other pit fruits, and it is to be understood that while but several specific embodiments of the invention have been herein shown and described, other modifications of the invention may be contrived without evading the spirit of the invention as the same is defined by the following claim.

We claim:

A fruit pitting device comprising a unitary sheet metal bar sheared and pierced to form a U-shaped scoop portion having its legs connected to the body of the bar and having its bight extending laterally from the body of the bar a sufficient distance to penetrate the fruit to the center thereof, said device having said body of the bar curled to form a ring portion adapted to snugly embrace a human finger with the scoop portion projecting therefrom in one lateral direction and a curled hook portion adapted to engage an adjacent finger projecting from the ring portion in a lateral direction opposite to the scoop portion.

CLARENCE N. SPRINGER.
HESTER RAE SPRINGER.

REFERENCES CITED

The following references are of record in the file of this patent:

UNITED STATES PATENTS

| Number | Name | Date |
| --- | --- | --- |
| 496,520 | Lord | May 2, 1893 |
| 591,942 | Willard | Oct. 19, 1897 |
| 1,035,008 | Hendrick | Aug. 6, 1912 |
| 1,515,588 | Avery | Nov. 18, 1924 |
| 1,515,923 | Berntson et al. | Nov. 18, 1924 |

FOREIGN PATENTS

| Number | Country | Date |
| --- | --- | --- |
| 116,037 | Great Britain | May 30, 1918 |